United States Patent Office — 3,496,211 — Patented Feb. 17, 1970

3,496,211
PREPARATION OF CYANOALKYLATED PHENOLS BY THE REACTION OF A METAL CYANIDE AND HYDROXY BENZYL PHENOLS
Martin Dexter, Briarcliff Manor, and John Denon Spivack, Spring Valley, N.Y., assignors to Geigy Chemical Corporation, Greenburgh, N.Y., a corporation of Delaware
No Drawing. Filed May 19, 1966, Ser. No. 551,237
Int. Cl. C07c 121/74, 103/26, 87/28
U.S. Cl. 260—465     6 Claims

ABSTRACT OF THE DISCLOSURE

Cyanoalkylated phenols are made from hydroxybenzyl alcohols by reacting the hydroxybenzyl alcohol with an alkali cyanide or alkaline earth cyanide, the molar ratio of cyanide to alcohol being from 1:1 to 10:1. In preferred embodiments, a catalytic amount of iodide salt is employed with potassium cyanide at a temperature of from 30° C. to 200° C.

THE INVENTION

This invention relates to a new and improved process for the conversion of alkyl phenols to cyanoalkyl phenols. In general this invention concerns a safe, and economical method for producing increased yields of readily purified cyanoalkyl phenols.

Cyanoalkyl phenols of improved purity are produced according to this invention by reacting a compound of the formula:

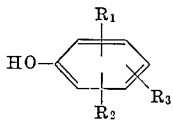

wherein $R_1$, $R_2$, and $R_3$ each independently may be hydrogen, straight or branched chain alkyl and cycloalkyl of 1 to 18 carbon atoms, hydroxy alkyl, carbalkoxyalkyl, and cyanoalkyl. At least one of the foregoing R groups has the structure

wherein $R_4$ is hydrogen or lower alkyl, i.e. an alkyl of 1 to 6 carbon atoms, and is fixed in the ortho or para position,
with an alkali cyanide or an alkaline earth cyanide.

The compounds which may be made by the new process of this invention are represented by the formula:

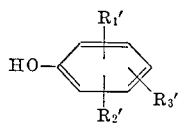

wherein $R'_1$, $R'_2$, and $R'_3$ are each independently hydrogen, straight or branched chain alkyl and cycloalkyl of 1 to 18 carbon atoms, carbalkoxyalkyl, or cyanoalkyl, and at least one of $R'_1$, $R'_2$ and $R'_3$ is

in which $R_4$ may be hydrogen or lower alkyl, and is fixed in the ortho or para position.

Thus it can be seen that this invention embraces the preparation of polycyanoalkylated phenols such as

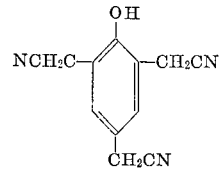

as well as mono- and di-cyanoalkylated phenols.

In a preferred embodiment of this invention 3,5-di-tert-butyl-4-hydroxybenzyl alcohol is converted to (3,5-di-tert-butyl - 4 - hydroxyphenyl) - acetonitrile by reaction with potassium cyanide.

The compounds resulting from the process of this invention are useful intermediates in the synthesis of many useful compounds, such as amines, carboxylic acids, esters, amides, etc. The esters and amides derived from these compounds have been shown to have useful stabilizing properties for polyolefin plastics.

Prior to the new method of this invention cyanoalkylated phenols were prepared by the reaction of chloroalkylated phenols with compounds such as sodium cyanide. The prior art method may be illustrated by the following equation representing the preparation of (3,5-di-tert-butyl-4-hydroxyphenyl)-acetonitrile.

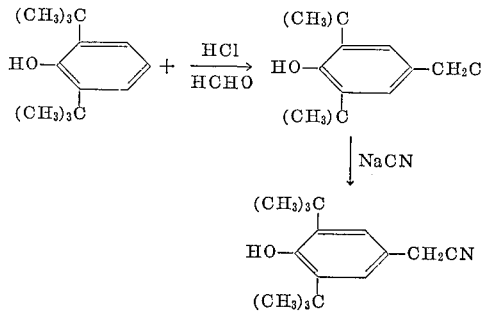

The preparation of cyanoalkylated phenols using such prior art methods involves a number of disadvantages in convenience, economy, safety, and purity of the final product.

The benzyl halides used in such methods are hydrolytically and oxidatively unstable, forming orange-brown precipitate during extended storage. Such halides are also irritants. They are also more expensive to make than the corresponding alcohols such as the substituted benzyl alcohols employed in the new method of this invention. In addition, to make the benzyl halides requires the use of substantially pure anhydrous hydrogen halide. The new method of this invention also produces higher yields of end-products than the prior art methods.

In a preferred embodiment of this invention (3,5-di-tert-butyl-4-hydroxyphenyl)-acetonitrile is made in the manner illustrated by the following equation:

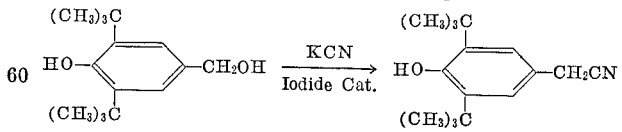

It is desirable that the reaction be carried out preferably in the presence of a non-reactive polar solvent such as acetone, methyl ethyl ketone, methyl propyl ketone, ethyl butyl ketone and the like, alcohols such as methanol, ethanol, isopropanol, as well as dioxane, tetrahydrofuran, diethylcarbitol, dimethylsulfoxide and dimethylformamide.

While the reaction of the benzyl alcohol with the alkali metal cyanide will proceed in the absence of a catalyst, such reaction is slower. Suitable catalysts are compounds that dissociate under the reaction conditions to yield iodide ions. These include iodides such as potassium iodide, sodium iodide, ammonium iodide, lithium iodide, calcium iodide, and quaternary ammonium iodides such as pyridinium methiodide, hexadecyl dimethyl ammonium iodide etc.

Reaction temperatures of the process of this invention may vary from about 10° C. to 200° C. with the preferred range being from about 30° C. to about 100° C.

A molar ratio of from about 1:1 to 10:1 or higher of cyanide to the hydroxy benzyl alcohol employed may be utilized, with a 1:1 ratio being preferred.

The following examples, describing certain representative embodiments of this invention, will serve to further illustrate the nature of the invention. It is to be understood that the examples are merely illustrative, and intended to enable those skilled in the art to practice the invention in all of the embodiments flowing therefrom.

EXAMPLE 1

(3,5-di-tert-butyl-4-hydroxyphenyl)acetonitrile from 3,5-di-tert-butyl-4-hydroxybenzyl alcohol (A) 13.0 grams of potassium cyanide (0.20 mole) and 2.0 grams of potassium iodide (0.014 mole) are dissolved in 70 ml. of water, the solution being diluted with 20 ml. of acetone and stirred rapidly to keep the two phases interdispersed.

(B) 23.6 grams of 3,5-di-tert-butyl-4-hydroxybenzyl alcohol (0.10 mole) is dissolved in 50 ml. acetone, the solution being added dropwise over a period of 15 minutes to (A) at 47° C.

After the addition of (B) to (A) is complete, the yellow mixture becomes bluish, and then bluish-purple in color. The reaction mixture is heated at reflux (62° C.) while stirring for 6 hours and then poured into 1 liter of ice water while maintaining rapid stirring. The product solidifies and is filtered. The filter cake is triturated in 100 ml. of warm water, the product filtered, and the filter cake washed free of cyanide. After drying in a vacuum oven at 40° C. for 16 hours, the filter cake (20.7 grams, 84% yield) is triturated with 50 ml. of hot petroleum ether, filtered, washed with cold petroleum ether, and finally dried. The (3,5-di-tert-butyl-4-hydroxyphenyl)acetonitrile obtained in this manner melts at 108–111° C.

(3,5-di-tert-butyl-4-hydroxyphenyl)acetonitrile is also made by following the procedure of Example 1 but omitting the potassium iodide. The final product obtained is more highly colored in this case, and lower melting, 99–108° C., but has the identical infrared spectra for 1% solutions in carbontetrachloride as well as thin layer chromatography on silica gel using a solvent mixture of chloroform, benzene, and ethyl acetate to develop the chromatogram.

EXAMPLE 2

If in the process Example 1, 2-n-butyl-5-cyclohexyl-4-hydroxybenezyl alcohol is employed in the same molar proportional amounts as a starting material (2-n-butyl-5-cyclohexyl-4-hydroxyphenyl)-acetonitrile is obtained as the final product.

EXAMPLE 3

Likewise if in the process of Example 1, 3-tert-butyl-6-hexanoyloxypropyl-4-hydroxybenzyl alcohol is employed in proportional amounts as a starting material (3-tert-butyl-6-hexanoyloxypropyl - 4 - -hydroxyphenyl)acetonitrile is obtained.

EXAMPLE 4

In a similar manner following the procedure of Example 1, 3-tert-butyl-5-cyanoethyl - 4 - hydroxybenzyl alcohol is reacted with ammonium cyanide and an end product of (3-tert-butyl 5-cyanoethyl-4-hydroxyphenyl) acetonitrile is obtained.

EXAMPLE 5

Following the general procedure of Example 1, 3,5-di-tert-butyl-4-hydroxy-α-propyl benzyl alcohol is reacted with sodium cyanide in the presence of ammonium iodide as the catalyst, and there is obtained (3,5-di-tert-butyl-4-hydroxyphenyl)-α-propyl acetonitrile.

EXAMPLE 6

Again repeating the procedure of Example 1, 4-tert-butyl-2-hydroxy-benzyl alcohol is reacted with the potassium cyanide (and 4-tert-butyl-2-hydroxyphenyl) acetonitrile is obtained.

What is claimed is:
1. A process for making a compound of the formula:

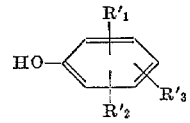

wherein $R'_1$, $R'_2$ and $R'_3$ are each independently hydrogen, lower alkyl, cyclohexyl or carb-(lower)alkoxy(lower)alkyl, and at least one of $R'_1$, $R'_2$ or $R'_3$ is

in which $R_4$ is hydrogen or lower alkyl, and said

is ortho or para to the hydroxy group of the phenol, which comprises reacting a compound of the formula:

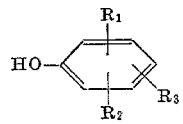

wherein $R_1$, $R_2$ and $R_3$ are each independently hydrogen, (lower)alkyl, cyclohexyl or carb(lower)alkoxy(lower)-alkyl, and at least one of $R_1$, $R_2$ or $R_3$ is

wherein $R_4$ is defined as above, and said

is ortho or para to the hydroxyl group of the phenol, with an alkali metal cyanide or alkaline earth metal cyanide or ammonium cyanide, with the molar ratio of said cyanide to said compound of the formula:

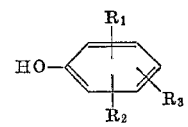

being from 1:1 to 10:1, at a temperature of from 10° C. to 200° C.

2. A process as claimed in claim 1 wherein the reaction is carried out at a temperature of 30° C. to 200° C.

3. A process for making a compound of the formula:

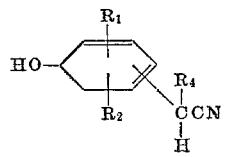

wherein $R_1$ and $R_2$ are each independently hydrogen, (lower) alkyl or cyclohexyl or carb(lower)alkoxy(lower)alkyl, and $R_4$ is hydrogen or lower alkyl, and said

is ortho or para to the hydroxyl group of the phenol, which comprises reacting a compound of the formula.

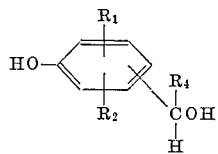

wherein $R_1$, $R_2$ and $R_4$ are each as defined above, and said

is ortho or para to the hydroxyl group of the phenol, with an alkali metal cyanide or alkaline earth metal cyanide or ammonium cyanide to the compound of the formula:

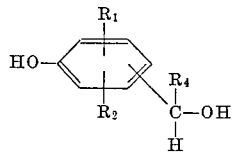

being from 1:1 to 10:1, at a temperature of from 10° C. to 200° C.

4. A process as claimed in claim 3 wherein the reaction is carried out at a temperature of 30° C. to 200° C.

5. A process for making (3,5-di-tert-butyl-4-hydroxyphenyl)acetonitrile which comprises reacting 3,5-di-tert-butyl-4-hydroxybenzyl alcohol with an alkali metal cyanide or an alkaline earth metal cyanide or ammonium cyanide, the ratio of the cyanide to the alcohol being from 1:1 to 10:1, at a temperature of 30° C. to 200° C.

6. A process for making (3,5-di-tert-butyl-4-hydroxyphenyl)acetonitrile which comprises reacting 3,5-di-tert-butyl-4-hydroxybenzyl alcohol with potassium cyanide, the ratio of potassium cyanide to the alcohol being from 1:1 to 10:1 at a temperature of 30° C. to 200° C.

References Cited

UNITED STATES PATENTS

| 2,509,387 | 5/1950 | Adams | 260—465 X |
| 2,733,257 | 1/1956 | Barber et al. | 260—465 |
| 2,783,265 | 2/1957 | Terpstra | 260—465 |
| 2,734,908 | 2/1956 | Dengel | 260—465 |

OTHER REFERENCES

Morrison et al.: Organic Chemistry, pp. 334, 365, and 366 (1962).

Mowry: Chemical Reviews, volume 42, pp. 191, 192, 196, and 197 (1948).

CHARLES B. PARKER, Primary Examiner

S. T. LAWRENCE III, Assistant Examiner

U.S. Cl. X.R.

260—45.85, 45.9, 473, 521, 559, 570.8, 621, 624